United States Patent [19]

Brock

[11] Patent Number: 4,956,737
[45] Date of Patent: Sep. 11, 1990

[54] MAGNETIC HEAD CONTOUR UTILIZING FACETS FOR AIR FILM SKIVING

[75] Inventor: George W. Brock, La Jolla, Calif.
[73] Assignee: Eastman Kodak Company, Rochester, N.Y.
[21] Appl. No.: 332,829
[22] Filed: Apr. 4, 1989
[51] Int. Cl.$^5$ .............................................. G11B 5/187
[52] U.S. Cl. ..................................... 360/122; 360/102
[58] Field of Search ............................... 360/122, 102

[56] References Cited

U.S. PATENT DOCUMENTS 4,695,909 9/1987 Momata .............................. 360/122

Primary Examiner—A. J. Heinz
Attorney, Agent, or Firm—Daniel Robbins

[57] ABSTRACT

To remove the air film adherent to a moving tape, rather than have the tape incident upon a steep shoulder of the head, a facet in the contour provides a gradual slope breaking the continuity of the head contour. The break in the contour provides an edge to skive the air adherent to the tape, and the facet provides a gently ramping surface which engages any asperity on the tape surface in a less aggressive manner than occurs when the asperity encounters a shoulder directly. Because of the stiffness of the tape, the tape does not contact the head contour over the length of the facet; the tape spans the contour between the edges of the facet. The air skived from the tape by the facet edge is squeegeed out between the tape and the facet, and a slot in the facet increases the cross sectional area through which the air is expelled. The tape spanning the facet is not in contact with the edges of the slot, the edge related problems of the prior art are avoided by the practice of the present invention.

6 Claims, 2 Drawing Sheets

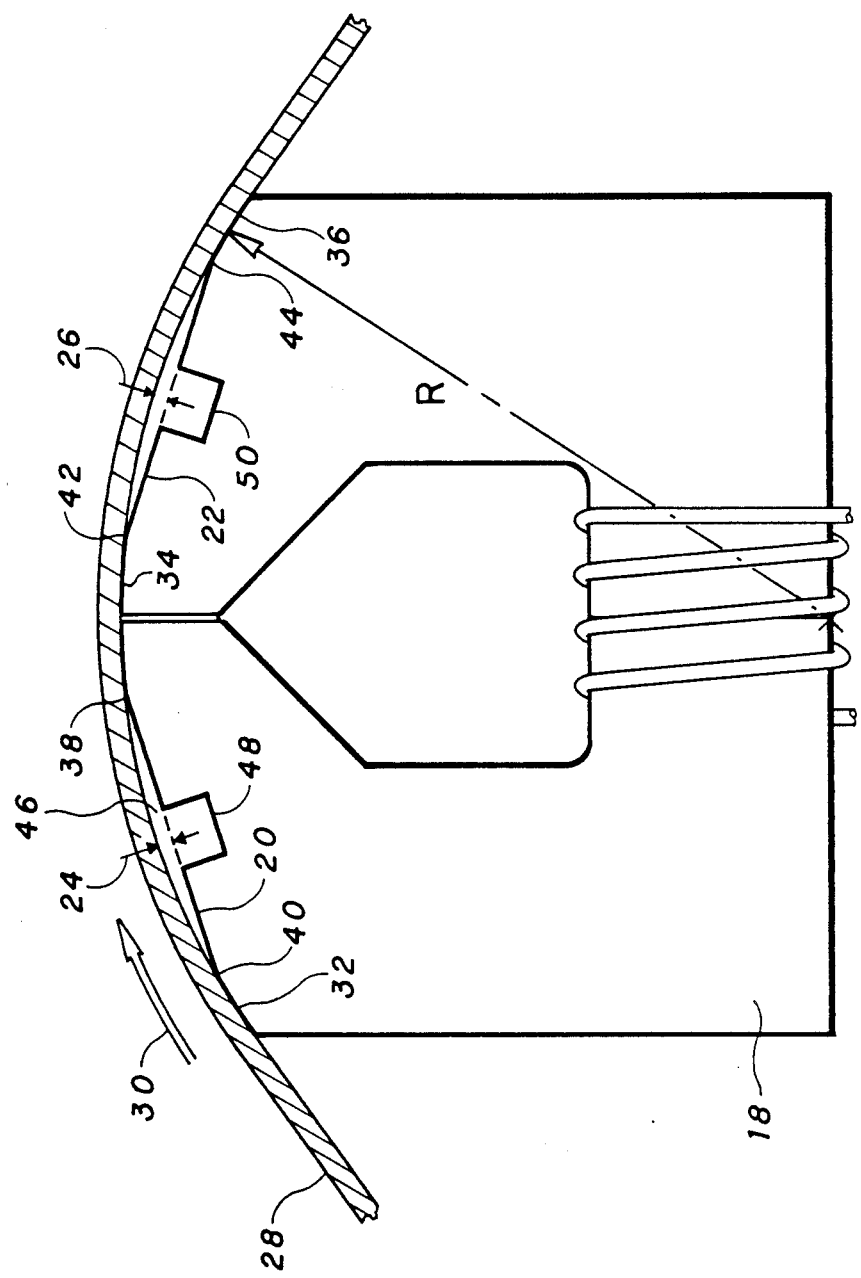

MAGNETIC HEAD CONTOUR UTILIZING FACETS FOR AIR FILM SKIVING

BACKGROUND OF THE INVENTION

1. Field of the Invention

This invention relates in general to magnetic recording, and in particular to the contour of the magnetic recording or playback head.

Figure 1:
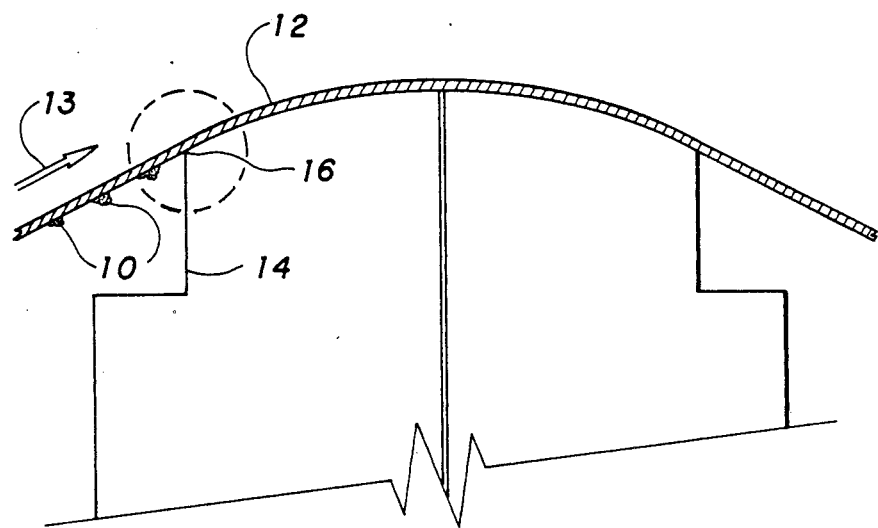
Figure 1A:
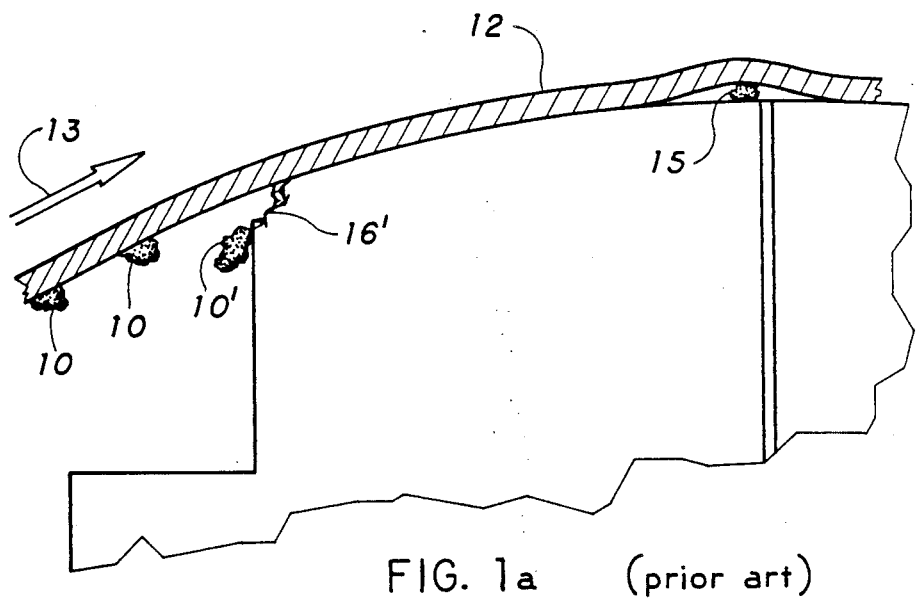

The invention, as well as the prior art, will be described with reference to the fiqures, of which:

FIG. 1 is a drawing of magnetic tape in contact with a magnetic head having a contour known in the prior art, FIG. 1a is an enlarged portion of FIG. 1 illustrating a problem related to the contour of FIG. 1, and FIG. 2 is a drawing of a magnetic tape in contact with a magnetic head having a contour in accordance with the present invention.

2. Description Relative to the Prior Art

The trend in the magnetic recording art is towards increasing system bandwidth by the recording and playback of shorter and shorter wavelength signals. This trend neccessitates intimate contact at the head gap between the magnetic head and the recording medium, since as known in the art, the playback signal is attenuated by head/medium separation according to the relation: Spacing Loss (in db) = 55 d/$\lambda$, where d is the separation and $\lambda$ is the recorded wavelength. An equivalent spacing loss relationship exists on the record side. Much effort has been expended in the art, therefore, to insure intimate contact between the magnetic head and the medium as recorded wavelenghts become shorter.

A contact problem encountered at higher tape speeds is the tendency of the magnetic tape to "fly" over the head. This occurs due to the air layer adherent to the moving tape becoming entrained between the magnetic head and the tape surface traversing the head. Typically, the head contour is a cylindrical surface in contact with the moving flexible tape under tension, with intimate contact required between tape and contour at the head gap. The entrained air, acting as an air bearing, lifts the tape from the head contour and separates the recording medium from the gap with resultant spacing loss.

A magnetic head with a steep shoulder for skiving the entrained air from the tape medium surface before it engages the head gap region has been disclosed in the prior art. Other related prior art shows grooves in the head contour where an edge of the groove similarly skives the entrained air. Such art may be found in U.S Pat. No. 4,699,016 in the names of Schmid et al, and in Japenese Patent No. 59-213013 in the name of Inoue. While the use of a steeply sloping plane, as described in the above patents, effectively skives the air layer from the tape, it also gives rise to the following problem particularly when used with particulate magnetic oxide tape.

Particulate magnetic tape consists of magnetic oxide particles coated onto a flexible web and secured to the web by means of a binder. The tape is calendered to effect as smooth a magnetic medium surface as possible. In spite of the calendering, a certain amount of surface roughness remains, and there may be asperities in the surface consisting of oxide particles which extend to heights on the order of 5 microinches above the surface. Referring to FIG. 1, it will be appreciated that such an asperity 10 attached to a tape 12 travelling at a speed, of say 150 inches per second in the direction of the arrow 13, and striking a steep head shoulder 14 (whose purpose is to skive the air layer adherent to the tape) will impact the edge 16 of the shoulder 14 with considerable force. Experiment has shown that under these conditions, as seen in FIG. 1a, an asperity 10 may be wrenched from the tape 12 and "welded" to the edge 16 by the impact, or the asperity may eject material 15 comprising the edge 16 when the head is fabricated from a hard but brittle material like ferrite. Not only is the edge 16 progressively destroyed by an accumulation of oxide particles or by material being ejected from the edge 16, but the "welded" asperities 10' or crumbled edge 16', then scratch and abrade the tape subsequently passing over the edge 16 destroying the coated tape surface and introducing drop out areas into the recording surface.

SUMMARY OF THE INVENTION

To remove the air film adherent to a moving tape, rather than have the tape incident upon a steep shoulder of the head, a gradual slope breaking the continuity of the contour is provided by means of a facet in the head contour. The break in the contour provides an edge to skive the air adherent to the tape, and the facet provides a ramping surface which engages any asperity on the tape surface in a less aggressive manner than occurs when the asperity encounters a shoulder directly. Because of the stiffness of the tape, the tape does not contact the head contour over the length of the facet; the tape spans the contour between the edges of the facet. The air skived from the tape by the facet edge is squeegeed out between the tape and the facet. For a typical head, however, the cross sectional area through which the air must escape is minute, and practice of the invention teaches slotting the facet so that the air is expelled through the increased cross section of the resulting slot. It is to be noted, that the tape spanning the facet is not in contact with the edges of this slot, so the edge related problems of the prior art are avoided by the practice of the present invention.

DESCRIPTION OF THE INVENTION

Referring to FIG. 2, the tape contacting contour of a magnetic head 18 is substantially cylindrical of radius R. The arcuate contour continuity is broken by facet 20, 22 ground into the head's tape contacting surface; the facets extending chordwise across the circular cross section of the head. A typical value for the radius is R=0.375", and the resultant maximum deviation 24, 26 of the contour at the facet from the cylindrical contour is approximately 33 microinches for a typical facet 20, 22 length of 0.010". A magnetic tape 28 travelling in the direction of the arrow 30, engages the head contour on its cylindrical segments 32, 34, 36. Because of the inherent stiffness of the tape 28, tape 28 does not contact the facet 20, 22 surfaces, but maintaining its cylindrical shape spans the facet 20 from facet 20 edges 38, 40 and facet 21 from facet 21 edges 42, 44. In traversing the head 18 in the direction of arrow 30, air adherent to the tape 28 is skived as the tape engages the edge 38. Similarly, for tape moving in the opposite direction, the edge 42 skives the air from the tape. It will be appreciated that a tape asperity approaching the edge 38 of the facet 20 will "ride" up the gentle slope of the facet 20, rather than impacting an abrupt shoulder, with a minimal possibility of impact damage to the edge 38. For the numerical values of radius and length of facet stated above, the angle between the facet 20 and the tape 28 at the edge 38 is a mere 0.76 degrees; sufficient to provide an air skiving edge but not steep enough for the edge 38 to aggressively engage the tape.

The air skived from the tape 28 when engaging the edge 38 must be expelled through the cross sectional area 46 between the facet 20 and the tape 28. Because the length of the facet 20 may be only 0.10" and the space 24 between the tape 28 and the facet 20 is on the order of 35 microinches, slots 48, 50 are provided in the facets 20, 22 to increase the cross section for the escape of the air skived from the tape. Slots 0.004" wide and 0.002" deep approximately increase the cross sectional area by a factor of 10 to provide an adequate escape channel. Because the tape does not contact the facet 20, 22 asperities of the order of peak heights of 5 microinches will not encounter the edges of the slots 48, 50.

The invention has been described in detail with particular reference to preferred embodiments thereof, but it will be understood that variations and modifications can be effected within the spirit and scope of the invention.

What is claimed is:

1. An improved magnetic head comprising:
   a. an arcuate surface segment having a contour adapted for contacting a flexible magnetic tape,
   b. at least one facet in said contour wherein first and second edges of said facet are discontinuities in said arcuate contour, whereby said first and said second edges are adapted for skiving entrained air from said tape, and
   c. at least one slot in said facet, whereby said slot is an escape channel for said air.

2. The head of claim 1 wherein said arcuate surface segment is a cylindrical surface segment.

3. The head of claim 2 wherein said facet intersects said cylindrical surface segment in a chordwise manner.

4. The head of claim 1 wherein said facet engages said tape at said first and said second edges without said tape touching the plane surface of said facet.

5. A magnetic head having a substantially arcuate contour adapted for contacting a flexible magnetic tape traversing said head, said tape having asperities thereon, said head further comprising:
   a. means for skiving entrained air from said tape while said tape is traversing said head, wherein any of said asperities incident upon said means skiving entrained air from said tape are gradually conveyed past said means for skiving entrained air from said tape without physically damaging said means for skiving entrained air from said tape, and
   b. means for channeling said entrained air away from said means for skiving entrained air,
   c. wherein said means for skiving entrained air is a chordwise positioned facet in said arcuate contour, and
   d. said means for channeling entrained air is a slot in said facet.

6. A magnetic head having a substantially arcuate contour adapted for contacting a flexible magnetic tape traversing said head, said tape having asperities thereon, said head further comprising:
   a. means for skiving entrained air from said tape while said tape is traversing said head, wherein any of said asperities incident upon said means for skiving entrained air from said tape are gradually conveyed past said means for skiving entrained air from said tape without physically damaging said means for skiving entrained air from said tape, and
   b. means for channeling said entrained air away from said means for skiving entrained air, and
   c. said means for skiving entrained air is a chordwise positioned facet in said arcuate contour.

* * * * *